(12) United States Patent
Hawkins (10) Patent No.: US 12,268,201 B1
(45) Date of Patent: Apr. 8, 2025

(54) PEST DETECTION

(71) Applicant: Pest Memo, LLC, Saginaw, MI (US)

(72) Inventor: Stacy Hawkins, Saginaw, MI (US)

(73) Assignee: Pest Memo, LLC, Saginaw, MI (US)

( * ) Notice: Subject to any disclaimer, the term of this patent is extended or adjusted under 35 U.S.C. 154(b) by 101 days.

(21) Appl. No.: 17/953,615

(22) Filed: Sep. 27, 2022

Related U.S. Application Data (60) Provisional application No. 63/248,781, filed on Sep. 27, 2021.

(51) Int. Cl.
*A01M 1/02* (2006.01)
*A01M 1/14* (2006.01)

(52) U.S. Cl.
CPC .............. *A01M 1/026* (2013.01); *A01M 1/14* (2013.01)

(58) Field of Classification Search
CPC ................................ A01M 1/026; A01M 1/14
USPC ........................................................ 340/573.1
See application file for complete search history.

(56) References Cited

U.S. PATENT DOCUMENTS

| | | | |
|---|---|---|---|
| 7,504,956 B2 | 3/2009 | Kates | |
| 9,335,413 B2* | 5/2016 | Weber-Grabau | ..... A01K 11/006 |
| 9,664,813 B2 | 5/2017 | Janet et al. | |
| 10,075,828 B2 | 9/2018 | Horton et al. | |
| 10,302,499 B2 | 5/2019 | Dixon et al. | |
| 10,496,893 B2 | 12/2019 | Diamond et al. | |
| 10,588,306 B2* | 3/2020 | Hur | .......... A01M 1/08 |
| 10,729,374 B1 | 8/2020 | Cogley | |
| 10,736,309 B1 | 8/2020 | Cogley | |
| 2010/0287816 A1* | 11/2010 | Abelbeck | .............. A01M 3/005 |
| | | | 43/107 |
| 2015/0234049 A1* | 8/2015 | Weber-Grabau | ........................... |
| | | | H01J 37/32935 |
| | | | 356/432 |
| 2017/0223943 A1 | 8/2017 | Park et al. | |
| 2017/0265443 A1 | 9/2017 | Winston, III et al. | |
| 2019/0000059 A1 | 1/2019 | Marka et al. | |
| 2019/0164019 A1* | 5/2019 | Djiofack | ................. G08B 13/22 |
| 2020/0146277 A1 | 5/2020 | Pinzone et al. | |
| 2023/0016494 A1 | 1/2023 | Janét et al. | |

FOREIGN PATENT DOCUMENTS

CN 110122443 A * 8/2019 .............. A01M 1/02

\* cited by examiner

*Primary Examiner* — Kam Wan Ma
(74) *Attorney, Agent, or Firm* — Young Basile Hanlon & MacFarlane, P.C.

(57) ABSTRACT

An assembly includes a device and a trap. The device includes a housing having an opening to an external environment and a microwave sensor disposed within the device that detects a pest within the housing. The device includes a camera disposed within the device that identifies a pest within the housing and a fan disposed within the device that directs air out of the opening to the external environment. The trap is insertable into the opening of the housing. The trap includes a screen positioned at a lateral wall of the trap to separate the trap from the fan of the device. The trap includes a base at the bottom wall of the trap. The base includes an adhesive that catches a pest and an attractant positioned adjacent to or in contact with the screen that attracts a pest.

19 Claims, 3 Drawing Sheets

PEST DETECTION

CROSS-REFERENCE TO RELATED APPLICATIONS

This application claims priority to and benefit of U.S. Provisional Application No. 63/248,781, filed on Sep. 27, 2021, which is incorporated herein by reference.

FIELD

This disclosure relates generally to an assembly designed to detect and identify pests, particularly cockroaches and bed bugs.

BACKGROUND

Cockroaches and bed bugs are a persistent problem in living spaces. These pests prolifically reproduce and can present a long-term problem for termination if not identified and dealt with early. Without proper identification techniques, the cockroaches and/or bed bugs cannot be dealt with properly or in a timely manner. When cockroaches and bed bugs are properly identified, a treatment method can be implemented to exterminate the pests. One problem with identifying cockroaches and bed bugs, however, is that common trapping and identifying methods utilize temperature-based sensors to detect pests. However, this method does not work well with cockroaches and bed bugs. As a result, it can be difficult to notify a user when the trap does not know if a pest is present at all or if a particular pest is present.

SUMMARY

Disclosed herein are implementations of an assembly having a device and a trap and a method to catch a pest.

In one implementation, the present disclosure provides an assembly including a device and a trap. The device includes a housing having an opening to an external environment and a microwave sensor disposed within the device that detects a pest within the housing. The device includes a camera disposed within the device that identifies a pest within the housing and a fan disposed within the device that directs air out of the opening to the external environment. The trap is insertable into the opening of the housing. The trap includes a screen positioned at a lateral wall of the trap to separate the trap from the fan of the device. The trap includes a base at the bottom wall of the trap. The base includes an adhesive that catches a pest and an attractant positioned adjacent to or in contact with the screen that attracts a pest.

In some implementations, the device further may include a communications module disposed within the housing that electronically connects an external device with the sensor, the camera, or both. The assembly may include a power source disposed within the housing that provides power to the camera, the microwave sensor, the fan, and/or the communications module. The assembly may further include a processor disposed within the housing that processes a detection and/or identification of a pest. The trap may further include a transparent screen positioned at a top wall of the trap and adjacent to the camera and/or the microwave sensor. The transparent sheet may separate the camera and/or the microwave sensor from an inside of the trap. The fan may be positioned to direct air through the screen of the trap. The device may further include a slot positioned at a location of the opening and a door that closes the trap at the opening when a pest is adhered within the trap at the adhesive.

In another implementation, this disclosure provides a method for detecting a pest that includes attracting a pest using an attractant housed within an assembly. The method includes catching a pest using an adhesive positioned within the assembly before the pest can contact the attractant and detecting a pest using a microwave sensor positioned within the assembly and configured to detect the pest only within the assembly. The method includes identifying the pest using a camera and a processor and/or an external device to determine a species of the pest and notifying a user that the pest has been detected by the microwave sensor and identified by the camera and the processor and/or the external device. The method includes trapping the pest inside the assembly by closing a door of the assembly so that the pest is enclosed within the assembly and caught at the adhesive.

The pest of the method may include a cockroach and/or a bed bug. The method may include activating a fan that blows fumes of the attractant to an external environment. The fan and the adhesive may be separated by a screen. The external device may include a tablet, phone, and/or computer. The microwave sensor and/or the camera may be separated from the attractant and/or the adhesive by a transparent wall.

In another implementation, this disclosure provides an apparatus. The apparatus includes a housing having an opening that allows a pest to enter the housing and a sensor or camera positioned within the housing that can identify a pest. The apparatus includes an attractant positioned at the opening and a fan that blows fumes from the attractant to an external environment. The apparatus includes an adhesive positioned on a base of the housing or a door that traps a pest within the housing.

The apparatus may include the camera, and the camera may be connected with a communications module that communicates a presence of a pest to a user. The apparatus may include the sensor, and the sensor may be connected with a communications module that communicates a presence of a pest to a user. The housing may include a first chamber that comprises the sensor or camera; and the fan. The housing may include a second chamber that comprises the adhesive or the door; and the attractant. The first and second chambers may be separated by a screen. The second chamber may be removable from the first chamber through the housing. The pest may be a cockroach and/or a bed bug.

Additional implementations are described in further detail below.

The present devices provide an assembly that detects cockroaches and bed bugs through use of a microwave sensor. Due to the cold blood of cockroaches and bed bugs, conventional sensors often lack the means to detect whether the cockroaches or bed bugs are present, so the inclusion of a microwave sensor with the other components provides a user the ability to identify the presence of the bug, identify the bug, and hold the bug long enough for the user to retrieve the assembly for inspection. Further, with implementation of various safeguards, the microwave sensor and the camera are only directed to the contents of the traps, which decreases the chance of a false detection.

DETAILED DESCRIPTION

Pest means any insect including, but not limited to, cockroaches, bed bugs, spiders, fleas, ants, termites, tics, beetles, earwigs, stink bugs, millipedes, centipedes, mites, weevils, or a combination thereof, or the like that has an undesirable presence in a living space. A cold-blooded pest means a pest that is detectable by a microwave sensor. Living space may mean any enclosure including, but not limited to, hotel rooms, bedrooms, loft spaces, kitchens, bathrooms, living spaces, garages, or the like. Device and/or trap may be interchangeable with container, box, receptacle, holder, vessel, or any combination thereof. Assembly may be interchangeable with apparatus.

The present disclosure provides a two-part assembly (i.e., a device and a trap) designed to sense, identify, and trap a pest, particularly a cold-blooded pest, such as a cockroach and/or a bed bug. A fan blows air over an attractant positioned in the assembly that is designed to attract a cold-blooded pest. As the attractant works, the cold-blooded pest will investigate the attractant and enter the opening of the assembly, which houses the microwave sensor. By using the microwave sensor, the assembly detects whether a cold-blooded pest has moved into the trap. Once the microwave sensor has detected the cold-blooded pest or while sensing the trap, the camera begins to capture images of the pest. The camera is connected with a processor or an external device capable of identifying the particular species of the pest. During the process of detecting and identifying, an adhesive at a bottom surface of the assembly (e.g., the trap) catches the pest within the assembly. After detecting, identifying, and catching the pest, the pest can be trapped by a door or the like that closes the opening from which the pest crawled into the assembly. Because the pest is caught, detected, identified, and trapped within the device, a proper treatment plan can be developed early in the pest stage and undesirable infestations can be avoided, which adversely affect the living space.

Figure 1A:
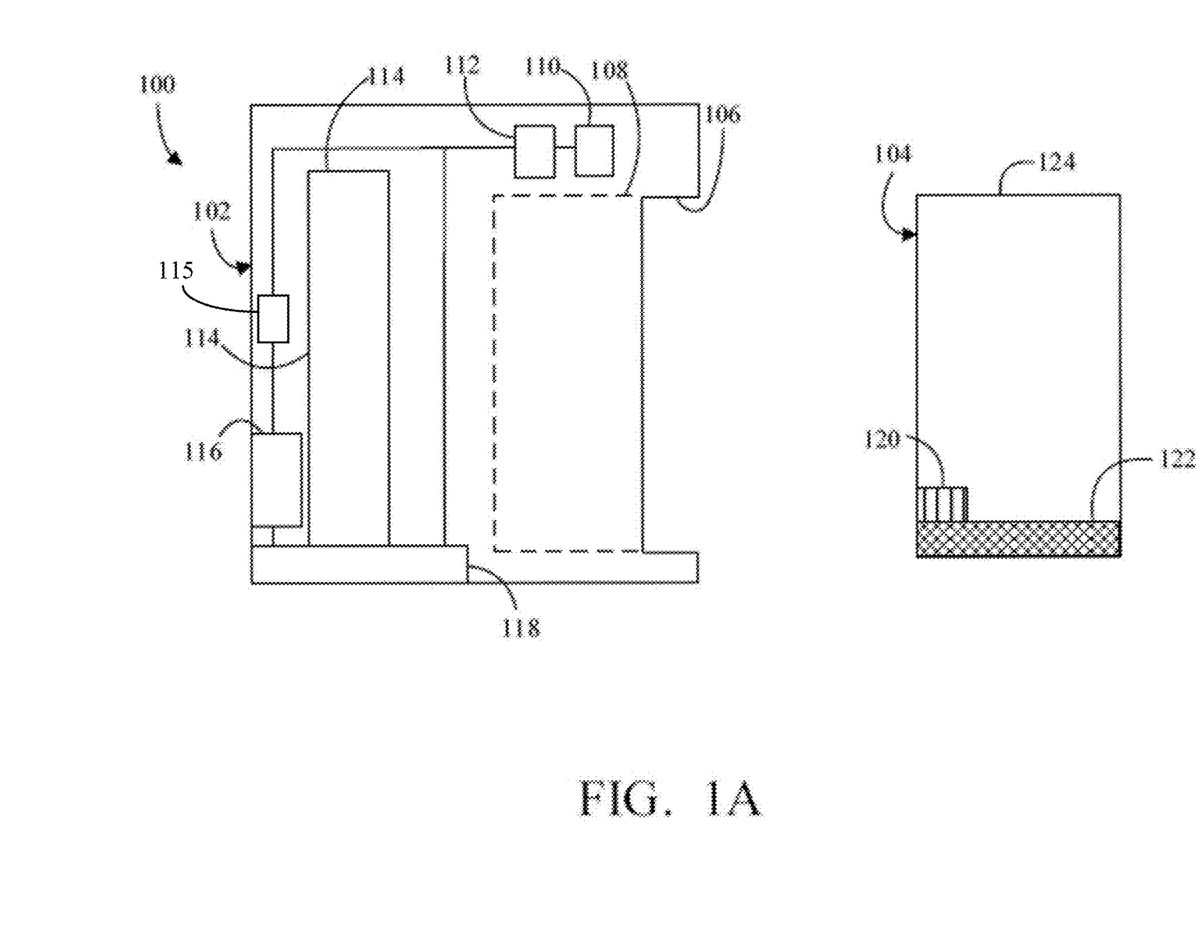
FIG. 1A is a cross-sectional view of an assembly for trapping and identifying a pest.

FIG. 1A is a cross-sectional view of an assembly 100 for trapping and identifying a pest. The assembly 100 includes a device 102 and a trap 104 that is insertable into the device 102 at an opening so that a pest can be caught, detected, identified, and trapped. Within the device 102, the trap 104 is positioned within the housing 108. In this configuration, the camera 110 is directed through a top wall 124 that is transparent (not shown) of the trap 104 so that images can be captured of contents of the trap 104. In other examples, the housing 108 may have a top wall 124 that is transparent so that the camera 110 is physically separated from the trap 104 and the optical components of the camera 110 are not damaged or dirtied by any pests within the trap 104. In other examples, one or more of the lateral walls of either the housing 108 and/or the trap 104 may be transparent, and the camera 110 may be directed through the transparent lateral wall. The camera 110 is directed perpendicularly toward the trap 104, or the camera 110 may be angled relative to a wall of the trap 104. The camera 110 may have any angle relative to a wall of the trap 104 sufficient to capture an image of all of the contents having a portion at the bottom of the trap 104. For example, the camera 110 may have an angle of about 60 degrees to about 89 degrees.

Although not shown in FIG. 1A, the trap 104 has an opening (see e.g., opening 232 of FIG. 2B) on the right side, which aligns with the opening 106 of the device 102. With this configuration, a pest can crawl or meander into the opening of the trap 104 and the opening 106 of the device and be ensnared by one or more components of the trap 104 discussed within this disclosure. The opening 106 of the device 102 and the opening of the trap 104 may have any height and/or width sufficient to allow a pest to enter into the trap 104 to be ensnared. For example, the openings may have a height of about 0.5 cm to about 15 cm. For example, the openings may have a width of about 0.5 cm of about 15 cm.

The combination of the device 102 and the trap 104 functions to ensnare a pest for further inspection or for advancing a treatment plan for the particular pest that is ensnared. To be functional, the trap 104 is inserted into the device 102 at the opening 106. The trap 104 may have any dimensional structure to be insertable into the device 102. For example, the trap 104 may have dimensions that are substantially equivalent to the opening 106. In other examples, the trap may have a height, width, and/or length of about 0.5 cm to about 15 cm. The device 102 and/or the trap 104 may have a structure of a box. In other words, the device 102 may be a six-sided structure. In other examples, the device 102 and/or the trap 104 may have any structure sufficient to hold the described components and allow a pest to be ensnared within the trap 104, such as a structure being pyramidic, spherical, cubic, cylindric, tetrahedral, triangular prism, square pyramidic, hexagonal prism, pentagonal prism, or any combination thereof. The device 102 may have any height, width, and/or length sufficient to house all of the components described herein and the trap 104. For example, the device 102 may have a height, width, and/or length of about 2 cm to about 15 cm.

Adjacent to the camera 110, a microwave sensor 112 is positioned within the device 102 and may be directed through the top wall 124 of the trap 104 for detecting the presence of a cold-blooded pest. In other examples, the microwave sensor 112 may be positioned at any location within the device 102 sufficient to detect whether a cold-blooded pest is present within the trap 104, without detecting other pests or items outside of the assembly 100. In some examples, the microwave sensor 112 may be positioned at any location adjacent to the trap 104 and inside the device 102 such that the microwave sensor 112 can achieve an accurate detection of a pest inside the trap 104, without sensing other detectable objects outside the assembly 100.

Adjacent to or in contact with the housing 108, a fan 114 is positioned within the device 102 to force air from the near side (e.g., the left side) to the far side (e.g., the right side) of the trap 104 at the opening 106. The fan 114 may be positioned at any location within the device 102 such that air is directed from an inside to an outside of the trap 104. Adjacent to the fan 114 in the device 102, a communications module 116 is positioned and connected with the camera 110 and/or the microwave sensor 112. When the pest is present in the trap 104, the camera 110 and/or the microwave sensor 112 send signals to the communications module 116. The communications module 116 may be configured to notify a user of the detection and/or identification of one or more pests within the trap 104. For example, the communications module 116 may send a signal to an external device or an application running on an external device to notify the user of one more or more pests within the trap 104.

The camera 110, the microwave sensor 112, the fan 114, and/or the communications module 116 rely on a power source 118 positioned within the device 102. The power source 118 may be any energy producing component used by the skilled artisan, such as a battery or combination of batteries. The camera 110, the microwave sensor 112, the fan 114, and/or the communications module 116 may be connected to the power source 118 by wires or any other energy transfer means sufficient to utilize the camera 110, the microwave sensor 112, the fan 114, and/or the communications module 116.

Figure 1B:
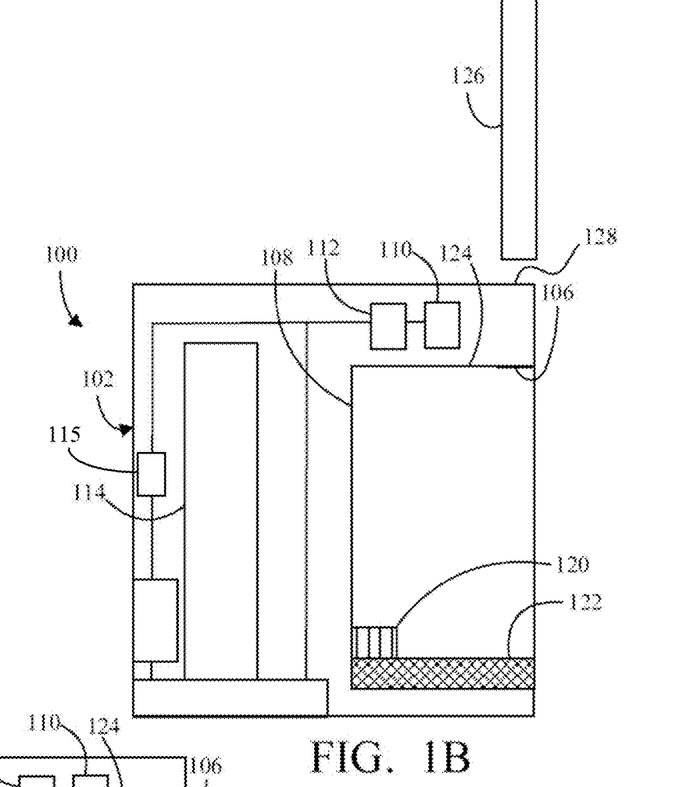
FIG. 1B is a cross-sectional view of the assembly that is open.
Figure 1C:
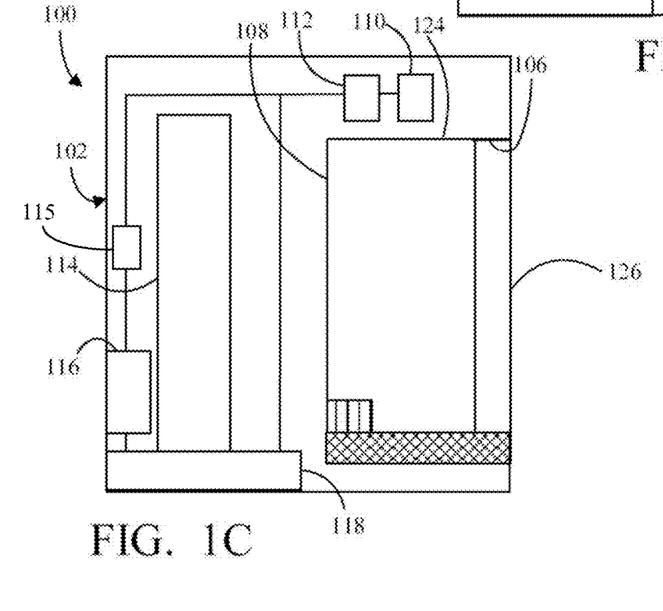
FIG. 1C is a cross-sectional view of the assembly that is closed.

The housing 108 functions to hold one or more components of the assembly 100 in place while waiting for a bug or pest to be caught in the device 102. The housing 108 may be defined by multiple distinct sections. For example, as shown in FIGS. 1A-1C, the housing 108 may have a section directed to holding the trap 104 in place, and the housing 108 may include another section where the other various components are held, such as the camera 110, the microwave sensor 112, the fan 114, the communications module 116, and/or the power source 118. In some examples, an attractant 120 may be positioned within the housing 108 so that the user can reuse the attractant in the device 102 and replace the trap 104 as bugs are caught on the adhesive positioned on the base 122 of the trap 104. For example, the attractant 120 may be positioned within the housing 108 and between a screen (see e.g., screen 230 of FIG. 2A) and the fan 114 when the trap 104 and the device 102 are assembled.

The trap 104 includes the attractant 120 positioned on a base 122 and adjacent to the left wall (e.g., a screen 130 of FIG. 2A) of the trap 104. The base 122 can include an adhesive that is configured to catch pest that wanders into the trap 104 by adhering to one or more body parts of the pest. The adhesive may be any compound sufficient to adhere to the pest and retain the pest on the base for a period of time. Structurally, the adhesive may have the structure of a gel, film, or tape. For example, the adhesive may include an epoxy, polyurethane, polyimide, honey, polyvinyl acetate, natural rubber, polychloroprene, acrylate, polyester-polyurethane resin, polyol-polyurethane resin, acrylic-urethane polymers, or any combination thereof. In lieu of the adhesive, any other mechanism, device, or catch may be used to ensnare the pest, such as a mechanical trap (e.g., a mouse trap). The far wall, as previously described, includes an opening (e.g., the opening 232 of FIG. 2B) to allow the pest into the trap; the near wall includes features that allow the wall to be permeable (e.g., the screen 230 of FIG. 2A) so that the fan 114 can push air towards the opening of the trap 104. The attractant 120 may be positioned on the base 122 at the near wall so that the pest is caught by the adhesive before the pest can come into contact with the attractant 120. In other examples, the attractant 120 is positioned within or adjacent to the housing between the right wall of the trap 104 and the fan 114. The attractant 120 may be positioned anywhere within the assembly so long as the fan can force any odors from the attractant 120 outside of the opening of the trap 104 and the opening 106 the device 102. The attractant 120 may be any compound or substance sufficient to attract a pest. For example, the attractant 120 may include pheromones, $CO_2$, food (e.g., cheese, peanut butter, or bread), beer, or any combination thereof.

In some examples, the fan 114 may be absent. In examples where the fan 114 is absent, the attractant 120 may simply permeate from the assembly 100 to the outside environment through standard air flow within an area. In other examples, other attractants 120 that are not dependent on scent may be used. In other words, any attractant 120 may be used in the assembly 100 to attract cold-blooded pests so that they enter the assembly 100 and are caught in the trap 104. For example, the attractant 120 may be an ultrasonic emitter configured to attract cold-blooded pests or a light configured to attract cold-blooded pests.

Because the attractant 120 and/or the adhesive may be housed within the trap 104, the trap 104 may be considered disposable. The device 102 includes components that may all be generally reusable (e.g., the camera 110, the microwave sensor 112, the fan 114, the communications module 116, and/or the power source 118), and hence, the device 102 may be used many times over. If the trap 104 is disposable, the user may catch a pest within the trap 104 and throw away the trap 104 after analyzing the pest, which allows the user to analyze the pest through the transparent top wall 124 and avoid physical contact with the pest. Then, another trap 104 can be inserted into the device 102 and the assembly 100 can be reused. In other examples, the structure of the trap 104 may be reusable, and only the adhesive and/or the attractant 120 may be replaced as they are worn down from interactions with the pest. For example, after one or several users, the adhesive on the base 122 may have a structure of a film and/or tape, and after one or more interactions with a pest, the user may remove the adhesive and insert a fresh film and/or tape of adhesive.

FIG. 1B is a cross-sectional view of the assembly 100 in an open configuration. As shown, the trap 104 is inserted or integrated within the device 102 so that the camera 110 and the microwave sensor 112 face downward and towards the base 122 of the trap 104. In this position, the assembly 100 is ready to attract a pest into the trap 104 because the opening (e.g., the opening 232 of FIG. 2B) of the trap 104 and the opening 106 of the device 102 are in a combined position (i.e., the openings are overlapping with, adjacent to, or in contact with each other). Additionally, the microwave sensor 112 is directed through the top wall 124 of the trap 104 so that pests can be detected at the base 122 of the trap 104. So that only the contents of the trap 104 are analyzed or sensed, the trap 104 has lateral walls and a bottom wall that are configured to block the microwave sensor 112, resulting in the exterior of the trap not being analyzed by the microwave sensor 112. With this configuration, false positives are avoided. In other configurations, the microwave sensor 112 is blocked by the exterior walls (i.e., lateral walls, top wall, bottom wall) of the device 102. In other examples, the material used to block may be include in the walls of both the trap 104 and the device 102. The material used to block the microwave sensor 112 within the walls of the trap 104 and/or the device 102 may be any material sufficient to block microwave emissions and/or reduce false detections of objects outside the assembly 100.

In the configuration of FIG. 1B, the assembly 100 including the trap 104 inserted within the device 102 is open because a door 126 has not been slid into a slot 128 of the device 102 and/or the trap 104. In this example, the door 126 slides through the slot 128 and to the base 122 of the trap 104, which seals off the trap 104 that is already closed off at the other lateral walls (see e.g., FIG. 1C). In other examples, no slot 128 may be present, and the door 126 may swing on a hinge (not shown) to close off the trap 104. The door 126 may have any configuration sufficient to close the opening 106 and the opening (e.g., the opening 232 of FIG. 2B) of the trap 104 so that a pest cannot escape from the point that the pest entered the trap 104 and/or device 102. The slot 128 may have any dimensions sufficient to allow the door to 126 to slide therebetween. For example, the slot 128 may have a width and/or a length of about 1 mm to about 2 cm. The door 126 may have any configuration sufficient block the opening 106 of the device 102 and/or the opening of the trap 104. The door 126 may have any configuration sufficient to slide within the slot 128.

The camera 110 functions to identify the pest that is located within the trap 104. The camera 110 may have any configuration sufficient to capture images of the inside of the trap 104 so that the pest can be identified. The camera 110 may include one or more components so that the camera 110 has the ability to identify pests in the dark (i.e., absence or minimal light). In other words, the camera 110 may have night vision capabilities. In other examples, the camera 110 includes a light and/or flash (not shown) so that when an image is captured the inside of the trap 104 is illuminated. The camera 110 may capture images only when the microwave sensor 112 detects the presence of a cold-blooded pest. In other examples, the camera 110 may capture images intermittently, such as an interval of about 1 to about 60 minutes, so that a user can monitor the trap 104 and determine if the microwave sensor 112 is detecting pests. In other examples, the camera 110 may capture images on a rolling basis so that a video is formed of the process of the pest entering the trap 104 and/or device 102 combination and the trap 104 can be monitored on a constant basis with continual feedback.

The microwave sensor 112 functions to detect the presence of a cold-blooded creature, such as a cockroach and/or a bed bug. The microwave sensor 112 may have any configuration sufficient to detect the presence of a cold-blooded pest. Once the microwave sensor 112 detects an object (e.g., a cold-blooded pest or the like), the microwave sensor 112 may be triggered to send a signal to the communication module 116 so that another signal may be sent to the user indicating the presence of a cold-blooded pest. The microwave sensor 112 may have the configuration of a motion detector so that the movement of a cold-blooded pest triggers a detection, which subsequently triggers a notification to the user through any means described herein. The microwave sensor 112 may emit waves (i.e., emissions) that are reflected back to the receiver, which triggers a detection. Where the microwave sensor 112 has the configuration of a motion detector, the waves continually emitted and received back may be the same when no pest is present in the trap 104. When a pest crawls into the trap 104 on the base 122, the microwave sensor 112 may detect a change in the waves, which triggers detection of a pest within the trap 104 so that a notification is sent to the user. The microwave sensor 112 may have a sensitivity configured to avoid false positives. In other words, where appropriate, the microwave sensor 112 may identify very minute changes and trigger a notification to the user or identification of the pest. In other examples, the microwave sensor 112 may be less sensitive so as to avoid picking up any change within and, instead, be targeted toward substantial changes. For example, a microwave sensor 112 may be tuned to not detect a very small pest, like a fruit fly, and may be simultaneously tuned to detect a larger pest, like a cockroach and/or bed bug, which can have many times the mass of a small pest. In some examples, the microwave sensor 112 may be angled to direct waves within the trap and avoid sending waves outside of the opening 106 in order to mitigate false detections. For example, the microwave sensor 112 may be angled relative to a wall of the trap 104 at an angle of about 89 degrees to about 60 degrees.

The fan 114 functions to force air, and hence the scent associated with the attractant 120, from the inside of the trap 104 to the external environment so that pests are drawn into the trap 104 by sensing the scent of the attractant 120. The fan 114 may have any configuration sufficient to direct the scent of the attractant to the external environment. In some examples, the fan 114 is positioned on any lateral wall of the trap 104 that includes a screen, such as the screen 230 of FIG. 2A. In other examples, the fan 114 is angled relative to one of the walls of the trap 104, where the angle of the fan 114 relative to the wall is sufficient to force air out of the trap 104 and to the external environment. For example, the angle of the fan 114 relative to the wall of the device 102 and/or trap 104 may be about 60 degrees to about 89 degrees. For example, the top wall of the trap 104 or opposing wall of the device 102 that is transparent (i.e., for capturing images) may include a plurality of holes to make the wall transparent, and the fan 114 may be positioned adjacent to or in contact with the microwave sensor 112 and/or the camera 110 and angled such that the air can be forced to the external environment. The fan 114 may be operated on a continual or intermittent cycle so that power may be conserved. For example, the fan 114 may be run for a period of time and be turned off for a period of time. The period of time for running may be about 30 seconds to about 10 minutes. The period of time that the fan 114 may be off may be about 5 minutes to about 60 minutes. Where the fan 114 is run on a continual cycle, the fan 114 may only be turned off by user interaction, such as by sending a signal from an external device or by operating an on and off switch.

FIG. 1C is a cross-sectional view of the assembly 100 in a closed configuration. In this example, the door 126 completely closes off the opening 106 so that the trapped pest cannot escape from the assembly 100. As described herein, the door 126 may include any mechanism sufficient to move the door 126 into position to close off the opening 106, such as hinges. In some examples, the door 126 may be locked by any suitable mechanism, such as a handle or a hook and eye latch.

Once the assembly 100 is closed, the trap 104 may be removed from the device 102 so that the contents of the trap 104 may be further inspected and/or analyzed. For example, a user may desire to inspect what pest is present or how many pests are ensnared within the trap 104. This may be useful to determine a specific treatment plan for the specific pest within the living space where the assembly 100 was positioned. After inspecting the trap 104, the trap 104 containing the pest may be thrown away, and a new trap 104 may be inserted into the opening 106 where the old trap 104 was positioned.

Figure 2A:
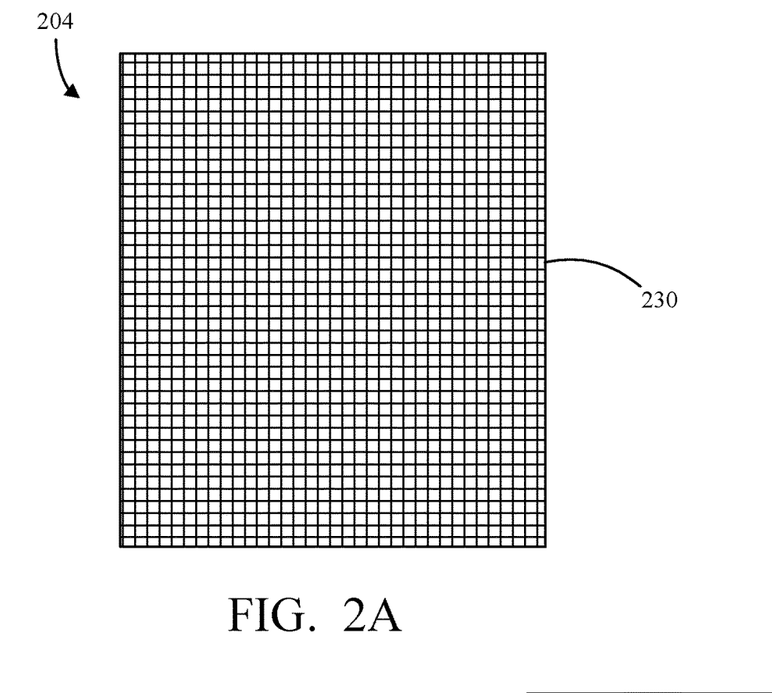
FIG. 2A is a side view of a trap.

FIG. 2A is a side view of a trap 204, which may be similar to the trap 104 of FIGS. 1A-1C. The trap 204 may be usable within the device 102 of FIGS. 1A-1C. This side of the trap 204 faces or is opposing the fan 114 of the device 102 of FIGS. 1A-1C and includes a screen 230 to separate the internal components of the device 102 from the trap 204.

The screen 230 functions to provide a permeable wall between the fan 114 and the attractant 120 positioned within the trap 104. The screen 230 may include any material in any configuration sufficient to separate a pest from the fan 114 and other internal components and allow air to be forced from the fan 114, through the trap 104, and out into the external environment. For example, the screen 230 may be a woven mesh. In another example, the screen may be a transparent wall with a plurality of holes disposed therein. The screen may additionally function to separate the fan 114 and/or other internal components (e.g., the camera 110, the microwave sensor 112, the communications module 116, and/or the power source 118) from the pest so that the pest does not dirty or damage any of the internal components of the device 102 when in use.

Figure 2B:
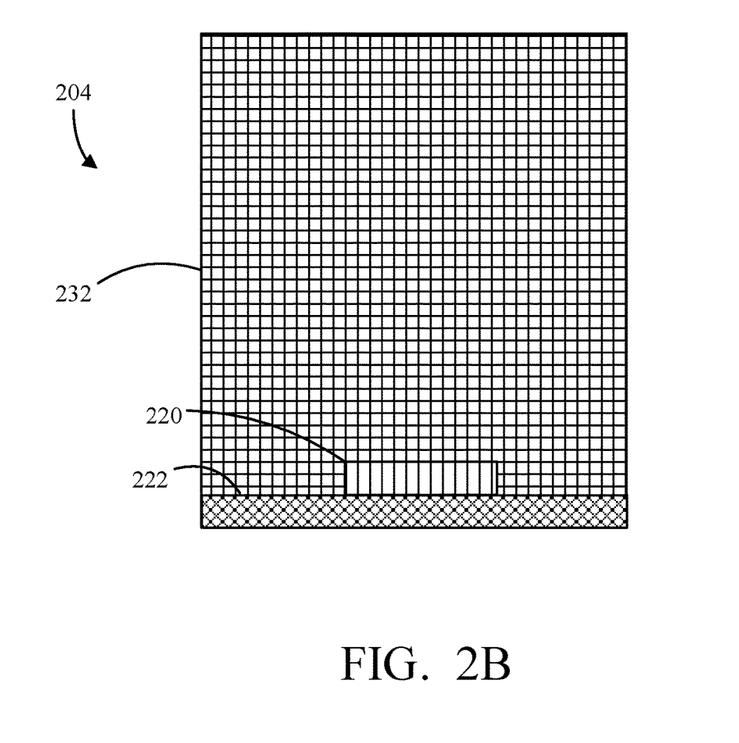
FIG. 2B is another side view of the trap of FIG. 2B.

FIG. 2B is another side view of the trap 204 of FIG. 2B. This side of the trap 204 includes an opening 232 that matches or is substantially similar to the opening 106 of the device 102 of FIGS. 1A-1C. Through this opening 232, a pest can crawl into the trap 204 and onto a base 222 to be caught on an adhesive (e.g., the adhesive described in relation to FIGS. 1A-1C) when drawn into the trap 204 by an attractant 220. At this opening 232, the door 126 closes over the opening 232 so that the pest cannot crawl out of the trap 204. The opening 232 may have any size sufficient to allow a pest to crawl into the trap 204, such as about a width of 0.5 cm to about 5 cm and/or a height of about 0.5 cm to about 10 cm.

In accordance with the disclosure herein, a method is disclosed for detecting and identifying a pest. For example, a method for detecting a pest that includes attracting a pest using the attractant 120 housed within the assembly 100. The method includes catching a pest using an adhesive (e.g., positioned on the base 122) positioned within the assembly 100 before the pest can contact the attractant and detecting a pest using the microwave sensor 122 positioned within the assembly 100 and configured to detect the pest only within the assembly 100. The method includes identifying the pest using the camera 110 and a processor 115 and/or an external device to determine a species of the pest and notifying a user that the pest has been detected by the microwave sensor 112 and identified by the camera 110 and the processor 115 and/or the external device. The method includes trapping the pest inside the assembly 100 by closing a door 126 of the assembly 100 so that the pest is enclosed within the assembly 100 and caught at the adhesive. The pest of the method may include a cockroach, a bed bug, any cold-blooded pest, or any combination thereof. The method may utilize any step or technique described within the scope of this disclosure in order to attract, detect, identify, catch, and analyze a pest and replace one or more components (e.g., the traps 104, 204 of FIGS. 1A-2B) of the assembly 100.

The communications module 116 functions to provides a pathway to communicate with one or more components of the assembly 100, such as the camera 110, the microwave sensor 112, the fan 114, or any combination thereof, and a user. Generally, the communications module 116 is in communication with an external device operated by a user. The communications module 116 may also be connected with the power source 118 so that a user can easily turn the device 102 on and off. The communications module 116 may operate through any means sufficient to communicate with a user. For example, the communications module 116 may operate by Bluetooth, GPS, WiFi, any other wireless communications methods, a wire connection, or any combination thereof. The communications module 116 may include any feature sufficient to amplify the connection with a user, such as an antenna or the like. In some examples, the communications module 116 includes an input/output interface (not shown) so that the user can plug into the device and check images or sensor data that may be stored on a memory component (not shown).

The power source 118 functions to provide energy to the fan 114, the camera 110, the microwave sensor 112, the communications module 116, any other internal component of the assembly 100, or any combination thereof. The power source 118 may include any means sufficient to provide power to the components of the assembly. For example, the power source 118 may include one or more batteries.

In some examples, the assembly 100 may further include a processor 115 that is configured to analyze whether a detection is legitimate or whether a captured image includes a target species of pest, like cockroaches and/or bed bugs. The processor 115 may include features or software configured to determine whether a false positive reading of the microwave sensor 112 is present. The processor 115 may be connected with an additional memory component (not shown) configured to store data, software, and/or information. The processor 115 may include data or software to analyze whether a capture image includes a likely pest that is being targeted. The processor 115 may be able to distinguish multiple species or multiple specimens within a single captured image. The processor 115 may be positioned anywhere within the device 102 and may be connected with the camera 110, the microwave sensor 112, the fan 114, the communications module 116, the power source 118, or any combination thereof. The processor 115 may receive energy from the power source 118. The processor 115 may control one or more intermittent processes, such as intermittent operation of the fan, intermittent capture of images, or intermittent operation of the sensor, so that power is conserved in the assembly. The processor 115 may be included with an external device that is configured to analyze data from camera 110, the microwave sensor 112, or both to determine whether a target pest is detected and identified.

The assembly 100 may further include a heat sink that functions to reduce overheating of the assembly 100 from parts that generate thermal energy. For example, the processor 115, the camera 110, the microwave sensor 112, the fan 114, the communications module 116, the power source 118, or any combination thereof may generate thermal energy, and the heatsink may be directly connected to one or more of the components or may be indirectly connected with one or more of the components through a suitable conductor. The heat sink may have any configuration that is integrate-able with the examples and implementations described herein.

The external device described herein may be any electronic device capable of notifying a user. For example, the external device may be a cell phone or pager that provides the user notice of notification, identification, and/or confirmation of a pest that is caught. In other examples, the external device may be a cell phone, computer, or tablet that can process the information from the microwave sensor 112 and/or the camera 110 and make a determination as to whether a pest being targeted has been caught.

In some examples, the communications module 116 may not be included, and instead, the determinations from the microwave sensor 112, the camera 110, and/or the processor 115 may simply provide a notification system on the assembly 100 itself. For example, the notification system may be a light that flashes intermittently or stays solid until the trap 104 is removed from the device 102. In other examples, the notification device may be an audible sound (e.g., a beep) that projects intermittently, for example, every 1-30 minutes.

The FIGS. described and shown herein are intended to be examples within the scope of this disclosure and are not intended to limit the disclosure in any way. The sizes of particular components are not to scale and may have any configuration or position within the assembly that allows the functions described herein to be performed.

Any numerical values recited include all values from the lower value to the upper value in increments of one unit provided that there is a separation of at least 2 units between any lower value and any higher value. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components or steps. Plural elements, ingredients, components, or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component, or step is not intended to foreclose additional elements, ingredients, components or steps.

What is claimed is:

1. An assembly, comprising:
   a device, comprising:
     a housing having an opening to an external environment;
     a microwave sensor disposed within the device and configured to detect a pest within the housing;
     a camera disposed within the device and configured to capture one or more images of the pest within the housing; and
     a fan configured to direct air out of the opening to the external environment; and a trap insertable into the opening of the housing, comprising:
       a screen to separate an interior of the trap from an interior portion of the device; and
       an adhesive configured to catch the pest,
     wherein the fan is positioned to direct air through the screen of the trap.

2. The assembly of claim 1, wherein the device further comprises:
   a communications module disposed within the housing and configured to electronically connect an external device with at least one of the microwave sensor or the camera.

3. The assembly of claim 2, further comprising:
   a power source disposed within the housing and configured to provide power to at least one of the camera, the microwave sensor, the fan, or the communications module.

4. The assembly of claim 1, further comprising:
   a processor disposed within the housing and configured to process at least one of a detection or identification of the pest within the trap.

5. The assembly of claim 1, wherein the trap further comprises a top wall that is adjacent to at least one of the camera or the microwave sensor when the trap is inserted into the opening of the housing.

6. An assembly comprising:
   a device, comprising:
     a housing having an opening to an external environment;
     a microwave sensor disposed within the device and configured to detect a pest within the housing;
     a camera disposed within the housing and configured to capture one or more images of the pest within the housing, and
     a fan configured to direct air out of the external environment; and
   a trap insertable into the opening of the housing, comprising;
     a screen to separate an interior of the trap from an interior portion of the device;
     an adhesive configured to catch the pest; and
     a top wall that is adjacent to at least one of the camera or the microwave sensor when the trap is inserted into the opening of the housing, wherein the top wall is transparent and separates the at least one of the camera or the microwave sensor from the interior of the trap when the trap is inserted into the opening of the housing.

7. The assembly of claim 6, wherein the fan is positioned to direct air through the screen of the trap.

8. An assembly comprising:
   a trap having a screen and an adhesive configured to catch a pest; and
   a device, comprising;
     a housing having an opening to an external environment wherein the trap is insertable into the opening of the housing;
     a microwave sensor disposed within the device and configured to detect the pest within the housing;
     a camera disposed within the housing and configured to capture one or more images of the pest within the housing;
     a fan configured to direct air out of the opening to the external environment;
     a slot positioned at a location of the opening; and
     a door configured to close the trap at the opening when the pest is adhered within the trap at the adhesive,
   wherein the screen of the trap separates an interior of the trap from an interior portion of the device.

9. An apparatus, comprising:
   a housing having an opening configured to allow a pest to enter the housing;
   a microwave sensor configured to detect the pest within the housing;
   a camera configured to capture one or more images of the pest in response to detection of the pest within the housing by the microwave sensor; and
   a trap positioned within the housing to trap the pest within the housing,
   wherein the microwave sensor and the camera are disposed in a first chamber of the housing, wherein the trap comprises an adhesive disposed within a second chamber of the housing, and wherein the second chamber is removable from the housing.

10. The apparatus of claim 9, wherein the camera is connected with a communications module that is configured to communicate a presence of the pest to a user.

11. The apparatus of claim 9, wherein the microwave sensor is connected with a communications module that is configured to communicate a presence of the pest to a user.

12. The apparatus of claim 9, wherein the pest is at least one of a cockroach or a bed bug.

13. The apparatus of claim 9, further comprising:
a fan configured to blow fumes from an attractant to an environment external to the housing, wherein an interior of the second chamber is physically separated from an interior portion of the first chamber.

14. The apparatus of claim 13, wherein the fan and the attractant are in different chambers of the housing.

15. The apparatus of claim 9, wherein the second chamber with the trap is insertable into the housing through the opening.

16. An apparatus, comprising:
a housing having an opening to an external environment;
a microwave sensor configured to detect a pest within the housing;
a camera configured to capture one or more images of the pest within the housing in response to detection of the pest within the housing by the microwave sensor;
a communications module configured to communicate a presence of the pest within the housing to a user;
an adhesive configured to trap the pest within the housing; and
a screen positioned between first and second chambers,
wherein the adhesive is disposed within the second chamber, and
wherein the microwave sensor, the camera, and the communications module are disposed within the first chamber.

17. The apparatus of claim 16, wherein the housing is configured to block microwave emissions.

18. The apparatus of claim 16, further comprising:
a fan disposed within the first chamber and configured to direct air out of the opening to the external environment, wherein the second chamber is removable from the apparatus and insertable into the housing through the opening.

19. An apparatus, comprising:
a housing having an opening configured to allow a pest to enter the housing;
a sensor or camera positioned within the housing and configured to identify a pest;
an attractant positioned at the opening;
a fan configured to blow fumes from the attractant to an external environment; and an adhesive positioned on a base of the housing or a door that is configured to trap a pest within the housing,
wherein the housing comprises a first chamber that comprises the sensor or camera, and the fan,
wherein the housing comprises a second chamber that comprises the adhesive or the door; and the attractant,
wherein the first and second chambers are separated by a screen, and
wherein the second chamber is removable from the first chamber through the housing.

* * * * *